United States Patent [19]

Inoue et al.

[11] Patent Number: 5,221,705

[45] Date of Patent: Jun. 22, 1993

[54] FLAME-RETARDANT THERMOTROPIC POLYESTER COMPOSITION AND ITS SHAPED ARTICLE

[75] Inventors: Toshihide Inoue, Ichinomiya; Yasunori Ichikawa, Nagoya; Masaru Okamoto, Tokai; Norio Kitajima, Nagoya, all of Japan

[73] Assignee: Toray Industries, Inc., Japan

[21] Appl. No.: 717,979

[22] Filed: Jun. 20, 1991

[30] Foreign Application Priority Data

Jun. 21, 1990 [JP] Japan ............... 2-163106
Jul. 6, 1990 [JP] Japan ............... 2-177510
Nov. 28, 1990 [JP] Japan ............... 2-327798
Apr. 17, 1991 [JP] Japan ............... 3-58328

[51] Int. Cl.$^5$ ............... C08K 5/52; C08K 5/10; C08K 5/02; C08L 67/02
[52] U.S. Cl. ............... 524/120; 524/128; 524/153; 524/291; 524/466; 524/494; 525/165
[58] Field of Search ............... 524/466, 469, 120, 494, 524/128, 291, 153; 525/169, 165

[56] References Cited

U.S. PATENT DOCUMENTS

| | | | |
|---|---|---|---|
| 4,107,231 | 8/1978 | Wurmb et al. | 525/165 |
| 4,713,407 | 12/1987 | Bailey et al. | 524/469 |
| 4,906,724 | 3/1990 | Yamanaka et al. | 528/176 |

FOREIGN PATENT DOCUMENTS

| | | |
|---|---|---|
| 180960 | 5/1986 | European Pat. Off. |
| 280179 | 8/1988 | European Pat. Off. |
| 347228 | 12/1989 | European Pat. Off. |
| 398624 | 11/1990 | European Pat. Off. |
| 528053 | 12/1983 | France |
| 118567 | 5/1989 | Japan |
| 2051524 | 2/1990 | Japan |

OTHER PUBLICATIONS

Page 293 of "Principles of Polymer Chemistry" by P. J. Flory 1971, Cornell Univ. Press Ltd.

*Primary Examiner*—Paul R. Michl
*Assistant Examiner*—Tae H. Yoon
*Attorney, Agent, or Firm*—Austin R. Miller

[57] ABSTRACT

A flame-retardant thermotropic polyester composition comprising 100 parts by weight of thermotropic polyester (A) and 0.5 to 60 parts by weight of poly(bromostyrene)(B) having the following structural unit produced from bromostyrene monomer, as the principal structural component thereof, and having a number average molecular weight of $1 \times 10^3$ to $30 \times 10^4$;

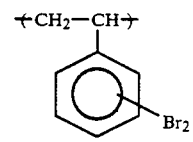

has excellent flame retardancy, mechanical properties and heat resistance, and the shaped articles molded from the composition has also superior appearance.

24 Claims, No Drawings

FLAME-RETARDANT THERMOTROPIC POLYESTER COMPOSITION AND ITS SHAPED ARTICLE

BACKGROUND OF THE INVENTION

The present invention relates to a flame-retardant thermotropic polyester composition having superior flame retardancy, excellent mechanical properties and great heat resistance, and to a shaped article of excellent appearance, molded from the composition.

The demand for an enhancement of the performances of plastics has recently increased, so many polymers having various novel performances have been developed and marketed. Among these polymers, optically anisotropic liquid crystal polymers characterized by parallel configuration of molecular chains have attracted attention, due to their superior flowability and mechanical properties, and the application of these polymers as machine parts, electric and electronic parts, and the like is widening.

In addition to the balance among general chemical and physical properties, a high degree of safety against flame, i.e., intense flame retardancy, is required for these industrial materials.

It is known, in general, that liquid crystal polymers have combustion resistance and when such polymers are directly exposed to flame, spontaneously occurring foam generates a carbonized layer.

Nevertheless, it was found that since a liquid crystal polyester as one of the representative liquid crystal polymer, formed by copolymerizing a polyester derived from an alkylene glycol and a dicarboxylic acid with an acyloxy aromatic carboxylic acid (for example, a polymer disclosed in U.S. Pat. No. 3,778,410/1973) did not have sufficient flame retardancy when the polyester was made into a thin (1/32") shaped article. It is known that such liquid crystal polyester acquires flame retardancy with the combined use of organic bromine compound and antimony compound (Japanese Patent Laid-open No. 118567/1988). It was found, however, that the addition of a vast amount of such compounds was inevitable, resulting in extremely poor retention stability at molding.

Thus, the present inventors found that the liquid crystal polyester of a specified structure could get flame retardancy with the use of a minor amount of organic bromine compounds alone, without the use of antimony compounds in combination, and that the retention stability thereof at molding remarkably could be enhanced.

However, it was found that even when the polyester was retained for a long time at high temperatures of 300° C. or more, the organic bromine compounds decomposed, leading to the degradation of the liquid crystal polyester. It was also found that the flame retardancy of its thin shaped article of a thickness of 1/32" or less was not always satisfactory.

SUMMARY OF THE INVENTION

The object of the present invention is to provide a thermotropic polyester composition with excellent flame-retardancy, mechanical properties and heat resistance.

Another object of the present invention is to provide a shaped article having a good appearance in addition to the properties of the composition described above.

The objects described above can be achieved by the present invention described hereinbelow.

Flame-retardant polyester composition and the shaped article molded from the composition, comprising allowing 100 parts by weight of a thermotropic polyester (A) to contain 0.5 to 60 parts by weight of poly(bromostyrene) (B) having the following structural unit produced from bromostyrene monomer as the primary structural component and having a number average molecular weight of $1 \times 10^3$ to $30 \times 10^4$;

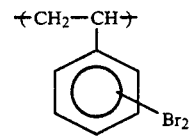

PREFERRED EMBODIMENTS OF THE INVENTION

The present invention will now be explained in detail.

The thermotropic polyester (A) to be used in the flame-retardant thermotropic polyester composition of the present invention is a polyester exhibiting thermotropic liquid crystal, among the polyesters comprising a unit selected from aromatic oxycarboxylate unit, aromatic dioxy unit, aromatic dicarbonyl unit, ethylenedioxy unit and the like, and is preferably a polyester selected form the following structural units (I) to (V);

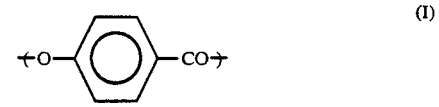 (I)

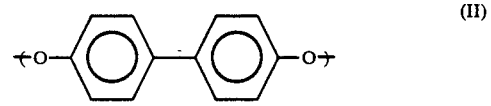 (II)

 (III)

 (IV)

 (V)

[wherein X in the formulas represents one or more groups selected from

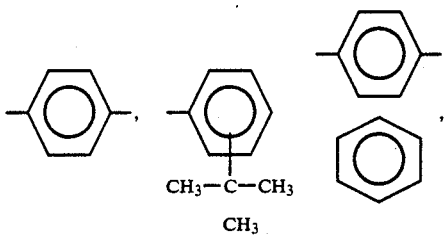

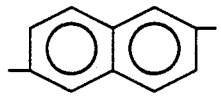

and Y represents one or more groups selected from

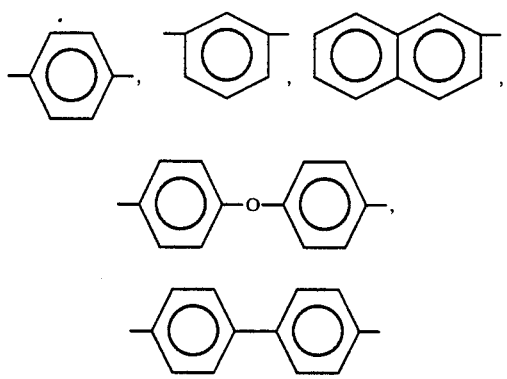

; the structural unit (V) is relatively equimolar to the structural units [(II)+(III)+(IV)]

The structural unit (I) described above represents the unit formed from p-hydroxybenzoic acid; the structural unit (II) represents the unit formed from 4,4'-dihydroxybiphenyl; the structural unit (III) represents the unit composed of aromatic diol selected from hydroquinone, t-butylhydroquinone, phenylhydroquinone, and 2,6-dihydroxynaphthalene; the structural unit (IV) represents the unit formed from ethylene glycol; the structural unit (V) represents the unit formed from aromatic dicarboxylic acid selected from terephthalic acid, isophthalic acid, 2,6-naphthalene dicarboxylic acid, 4,4'-diphenyl ether dicarboxylic acid, and 4,4'-diphenyl-dicarboxylic acid.

The copolymerizing amount of the structural units (I), (II), (III) and (IV) is preferably the following copolymerizing amount.

That is, in the case of containing the structural unit (IV), the copolymerizing amount of the structural units [(I)+(II)+(III)] is 77 to 95 mol %, more preferably 82 to 93 mol %, of the structural units [(I)+(II)+(III)+(IV)], in terms of heat resistance, flame retardancy and mechanical properties. The copolymerizing amount of the strucutral unit (IV) is preferably 23 to 5 mol %, more preferably 18 to 7 mol % of the amount of the units [(I)+(II)+(III)+(IV)]. The molar ratio of the structural units (I) / [(II)+(III)] is preferably 75/25 to 95/5, more preferably 78/22 to 93/7. The molar ratio of the structural unit (II) / (III) is preferably 100/0 to 67/33, more preferably 100/0 to 90/10. The structural unit (V) is preferably a unit formed from terephthalic acid, and its amount is relatively equimolar to the amount of the structural units [(II)+(III)+(IV)].

The following processes can be mentioned as the typical process for the preparation of the thermotropic polyester to be used in the present invention, and the process (2) is particularly preferable.

(1) A process comprising deacetylation polymerization of p-acetoxybenzoic acid, diacylated product of an aromtatic dihydroxy compound such as 4,4'-diacetoxybiphenyl, an aromatic dicarboxylic acid such as terephthalic acid, and at least one selected from polyesters and oligomers derived from ethylene glycol and an aromatic dicarboxylic acid, or bis($\beta$-hydroxyethyl) esters of aromatic dicarboxylic acids.

(2) A process comprising reacting p-hydroxybenzoic acid, an aromatic dihydroxy compound such as 4,4'-dihydroxybiphenyl, an aromatic dicarboxylic acid such as terephthalic acid, and at least one compound selected from polyesters and oligomers derived from ethylene glycol and an aromatic dicarboxylic acid, or bis($\beta$-hydroxyethyl)esters of aromatic dicarboxylic acid, with acetic anhydride, and subjecting the reaction mixture to deacetylation polymerization.

In the process (2), the deacetylation polymerization is preferably carried out by the melt polymerization method, but it is not preferred to use the solid polymerization method or the methods in which polymerized products become multi-dispersed solids during the polymerization.

The above-mentioned polycondensation reaction is effected even in the absence of catalyst, but it is sometimes preferable to add a metal compound such as stannous acetate, tetrabutyl titanate, sodim acetate, potassium acetate or metallic magnesium.

The melting point (Tm, °C.) of the liquid crystal polyester (A) used in the present invention is preferably 230° to 350° C. and more preferably 250° to 330° C.

Furthermore, a liquid crystal polyester having a melting point (Tm, °C.) satisfying the following formula (1) is preferable.

$$-10 < Tm + 5.89x - 385.5 < 10 \tag{1}$$

[wherein x in formula (1) represents the ratio (mol %) of the structural unit (IV) to [(I)+(II)+(III)+(IV)]].

In the case that the composition ratio of the structural units (I) to (V) satisfying the condition described above cannot have the melting point represented in formula (1) described above, due to the difference in polymeric composition distribution and randomness, the flowability of the polymer and the heat resistance and mechanical properties of its shaped article are deteriorated, and at high temperatures, the polymer is readily decomposed, leading to the weight decrease on heating. Therefore, the use of a polyester satisfying the formula (1) is preferable.

The melting point (Tm, °C.) referred herein represents the endothermic peak temperature which is observed when the measurement is carried out at a temperature-elevating rate of 20° C./min by using a differential scanning calorimeter, i.e., $Tm_2$, described hereinafter.

For the differential scanning calorimetric measurement described above, a polymer obtained by polymerization is heated from room temperature to a temperature exceeding the melting point at a temperature-elevating rate of 20° C./min, and the observed endothermic peak temperature (hereinafter referred to as "$Tm_1$") is measured. After the measurement of $Tm_1$, the polymer is maintained at a temperature of $Tm_1+20°$ C. for 5 minutes, followed by cooling once down to room temperature at a temperature-dropping rate of 20° C./min, and the temperature is then elevated at a rate of 20° C./min. The endothermic peak temeprature (hereinafter referred to as "$Tm_2$") measured at this second run is measured. Preferably, the requirement of $|Tm_1-Tm_2| \leq 10°$ C., more preferably the requirement of $|Tm_1-Tm_2| \leq 6°$ C., is satisfied. If this temperature difference is 10° C. or less, the randomness of the polymer is satisfactory.

The logarithmic viscosity of the liquid crystal polyester, as measured in pentafluorophenol at 60° C. and a concentration of 0.1 g/dl, is preferably 1.0 to 3.0 dl/g, and particularly preferably 1.3 to 2.5 dl/g. If the logarithmic viscosity is less than 1.0 dl/g, the mechanical properties are not satisfactory; if the logarithmic viscosity is higher than 3.0 dl/g, the flowability is lowered, so such cases are not preferable in any means.

The melt viscosity of the thermotropic polyester (A) to be used in the present invnetion is preferably 100 to 20,000 poise and more preferably 200 to 7,000 poise, and most preferably 300 to 2,000.

The melt viscosity is a value measured at a temperature of the melting point $(Tm_2)+10°$ C. and a shear rate of 1,000 sec$^{-1}$, by using a Koka type flow tester.

When polycondensing the thermotropic polyester (A) to be used in the present invention, the following in a range of minor ratios can be copolymerized other than the components constituting the structural units (I) through (V), as long as the attainment of the objects of the present invention is not hindered; aromatic dicarboxylic acids such as 3,3'-diphenyldicarboxylic acid, 2,2'-diphenyldicarboxylic acid, 1,2-bis(phenoxy)ethane-4,4'-dicarboxylic acid, etc; aliphatic dicarboxylic acids such as adipic acid, azelaic acid, sebacic acid, dodecanedionic acid, etc.; alicyclic dicarboxylic acids such as hexahydroterephthalic acid, etc.; aromatic diols such as chlorohydroquinone, methylhydroquinone, 4,4'-dihydroxydiphenylsulfone, 4,4'-dihydroxydiphenylpropane, 4,4'-dihydroxydiphenyl sulfide, 4,4'-dihydroxybenzophenone, 4,4'-dihydroxydiphenyl ether, 3,3',5,5,'-tetramethyl-4,4'-dihydroxybiphenyl, etc.; aliphatic and alicyclic diols such as 1,4-butanediol, 1,6-hexanediol, neopentyl glycol, 1,4-cyclohexanediol, 1,4-cyclohexanedimethanol, etc.; ethylene oxide adducts of aromtaic diols such as an ethylene oxide adduct of bisphenol A, etc.; aromatic hydroxycarboxylic acids such as m-hydroxybenzoic acid, 2,6-hydroxynaphthoic acid, etc.; ethylene oxide adducts of aromatic hydroxycarboxylic acids such as β-hydroxyethoxybenzoic acid, etc.; and aromtaic imide compounds (imides of aromatic dicarboxylic acids, hydroxycarboxylic acids any dihydroxy compounds having imide linkage in the main chain).

The flame retardant (B) to be used in the present invention is poly(bromo styrene) having the following structural unit produced from bromo styrene monomer as the principal structural component and having a number average molecular weight of $1 \times 10^3$ to $30 \times 10^4$, and the ratio of the weight average molecular weight to the number average molecular weight is preferably 2 to 4.

Preferably, the poly(bromo styrene) described above contains 60 wt. % or more of dibromo styrene unit, and more preferably the poly(bromo styrene) contains 70 wt. % or more thereof. The poly(bromo styrene) may be a poly(bromo styrene) copolymerizing 40 wt. % or less, preferably 30 wt. % of less of monobromo styrene and/or tribromo styrene.

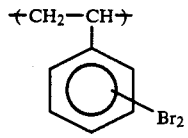

The number average molecular weight of the poly(bromo styrene) is preferably $1 \times 10^4$ to $15 \times 10^4$, more preferably $1 \times 10^4$ to $15 \times 10^4$ and the weight average molecular weight thereof is $2 \times 10^4$ to $60 \times 10^4$. If the number average molecular weight is less than $1 \times 10^3$, the mechanical properties and solder thermal resistance during molding retention are severely reduced, which is not preferable. On the other hand, if the number average molecular weight is larger than $30 \times 10^4$, the flowability of the composition of the present invention is deteriorated, which is not preferable. It is preferred that the polybrominated styrene has an apparent density of 1.0 g/cm$^3$ or more and a bulk density of 1.1 g/cm$^3$ or more; more preferably an apparent density of 1.1 g/cm$^3$ or more and a bulk density of 1.2 g/cm$^3$ or more. And the poly(bromostyrene) is preferably dispersed at an average diameter of 2.5μ or less, more preferably 2.0μ or less, in a thermotropic polyester.

On the other hand, the brominated(polystyrene) can be produced by brominating the polystyrene obtained by radical polymerization or anion polymerization usually, but the brominated (polystyrene) decreases the mechanical properties and the deterioration of the color tone, so in the present invention, it is required poly(bromostyrene) which is produced from bromostyrene monomer.

The number average molecular weight referred herein is a value measured by using gel permeation chromatography, and is a relative value based on the molecular weight of polystyrene.

The poly(bromostyrene) to be added is 0.5 to 60 parts by weight to 100 parts by weight of the thermotropic polyester, preferably 1 to 20 parts by weight, and more preferably 2 to 15 parts by weight. If less than 0.5 parts by weight, the flame retardant effect is not sufficient; if more than 60 parts by weight, the mechanical and thermal properties may be deteriorated, which is not preferable.

In accordance with the present invention, not only the heat resistance but also the flame retardancy can be improved by the use of a phenolic compound of a molecular weight of 500 or more and having one or more aromatic rings and/or phosphite compound, in combination with the flame retardant (B). It is important that the phenolic compound and the phosphite compound each have a molecular weight of 500 or more, preferably a molecular weight of 550 to 5,000 and also containing one or more aromatic rings.

In the case that a compound of a molecular weight of less than 500 or a compound which does not contain aromatic rings is used, the effect of improving retention stability during molding is so small that it is difficult to solve the problems of the present invention.

As the phenolic compound having a molecular weight of 500 or more and having one or more aromatic rings, there can be mentioned those having the structural unit represented by the following;

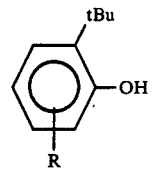

[wherein R is an alkyl group having 1 to 10 carbon atoms such as methyl, ethyl, propyl, tertiary butyl and the like], and concretely, there can be mentioned as follows; triethylene glycol-bis-3-(3'-t-butyl-4'-hydroxy-5'-methylphenyl)propionate, 1,3,5-tris(3',5'-di-t-butyl-4'-hydroxybenzoly)isocyanurate, 1,3,5-trimethyl-2,4-6-tris(3',5'-di-t-butyl-4'-hydroxybenzyl)benzene, hexamethylene glycol bis[β-3,5-di-t-butyl-4-hydroxyphenyl)propionate], 6-(4'-hydroxy-3',5'-di-t-butylanilino)-2,4-bis-octyl-thio-1,3,5-triazine, tetrakis[-methylene-3(3',5'-di-t-butyl-4'-hydroxyphenyl) propionate]methane, 2,2'-thio[diethyl-bis-3(3',5'-di-t-butyl- 4'-hydroxyphenyl)propionate, n-octadecyl-3(4'-hydroxy-3',5'-di-t-butylphenol)-propionate, N,N'-hexamethylene-bis-3-(3',5'-di-t-butyl-4'-hydroxypropamide), 1,3,5-tris(3',5'-di-t-butyl-4'hydroxybenzyl)isocyanurate, 3,5-di-t-butyl-4-hydroxy-benzylphosphoric acid dimethyl ester, nickel salt of bis(3,5-di-t-butyl-4-hydroxybenzyl phosphoric acid)monomethylester, etc., and n-octadecyl-3(4'- hydroxy-3',5'-di-t-butylphenyl)propionate, tetrakis[methylene-3(3',5'-di-t-butyl-4'-hydroxyphenyl) propionate]methane, triethylene glycol bis-3-(3'-t-butyl-4'-hydroxy-5-methylphenyl)propionate, etc., are preferably used. They may be used singly or in combination of two or more.

As the phosphite compound having a molecular weight of 500 or more and one or more aromatic rings, there can be mentioned tris(nonylphenyl) phosphite, tetra(tridecyl)-4,4'-isopropylidene diphenyl phosphite, 2,2'-methylene-bis(4,6-di-t-butylphenyl) n-octylphosphite, bis(2,4'-di-t-butylphenyl)pentaerythritol diphosphite, bis(2,6-di-t-butyl-4-methyl phenyl) pentaerythritol diphospite, bis(nonylphenyl) pentaerythritol diphosphite, tetraphenyldipropylene glycol diphosphite, 4,4'-butylidene-bis(3-methyl-6-t-butylphenyl-di-tridecyl)-phosphite, tris(2,4-di-t-butylphenyl) phosphite and the compound of the following formula;

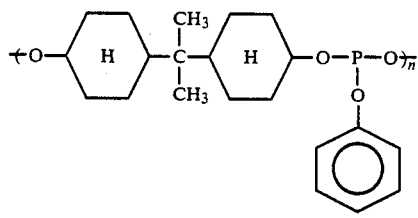

and 2,2'-methylene-bis(4,6-di-t-butylphenyl) n-octyl-phosphite, tris(2,4-di-t-butylphenyl) phosphite, bis(2,4-di-t-butylphenyl) pentaerythritol diphosphite, bis(2,6-di-t-butyl-4-methylepheny) pentaerythritol diphosphite and the like are preferably used.

The phenolic compound and/or the phosphite compound, having a molecular weight of 500 or more and one or more aromatic rings, may be used singly or in combination with each other, and the combined use thereof is preferable. The amount thereof to be added is 0.001 to 5 parts by weight to 100 parts by weight of thermotropic polyester, preferably 0.05 to 3 parts by weight. If the amount to be added is less than 0.001 part by weight, the effect of improving heat resistance cannot be produced; if the amount exceeds 5 parts by weight, the tendency to deteriorate the mechanical properties of the thermotropic polyester is observed, which is not preferable.

The thermotropic polyester composition of the present invention thus produced shows excellent flame retardancy and heat resistance, and the injection molded articles thereof of a thickness not more than 1/32" can have the value V-0 at UL 94 Standard Vertical-type Combustion Test (ASTM D 790 Standard).

In accordance with the present invention, it is preferred to add 1 to 200 parts by weight, more preferably 15 to 150 parts by weight of a filler to these thermotropic polyester compositions; as the filler, there can be mentioned fibrous, powdery, granular and plate-shaped inorganic fillers such as glass fiber, potassium titanate fiber, gypsum fiber, brass fiber, stainless fiber, steal fiber, ceramic fiber, boron whisker fiber, mica, talc, silica, calcium carbonate, glass bead, glass flake, glass microballoon, clay, wollastonite, and titanium oxide, and cabon fiber and aromatic polyamide fiber.

Among the fillers, glass fiber is preferably used. Any glass fibers customarily used for reinforcing resins can be used without limitation. For example, long filaments, or short filaments such as a chopped strand, or a milled fiber can be selected and used. The average diameter of the glass fiber is preferably 3 to 15 $\mu$m, and more preferably 3 to 11 $\mu$m. From the respect of flame retardancy as well as the improvement of the anisotropic characteristics of the shaped article and the surface appearance and flowability thereof, a glass fiber having a filament diameter of 3 to 8 $\mu$m particularly preferably may be used as the filler.

The glass fiber can be covered with or gathered by a thermoplastic resin such as an ethylene/vinyl acetate compolymer or a thermosetting resin such as an epoxy resin. Furthermore, the glass fiber can be treated with a silane coupling agent, a titanate coupling agent or other surface-treating agent.

Common additives and other thermoplastic resins such as antioxidants and heat stabilizers, ultraviolet absorbers such as resorcinol, salicylates, benzotriazole and benzophenone, lubricants and release agents such as montanic acid, salts thereof, esters thereof, half-esters thereof, stearyl alcohol, stearamide and polyethylene wax, colorants including dyes such as Nigrosines and pigments such as cadmium sulfide, phthalocyanine and carbon black, plasticizers and antistatic agents, can be added to the composition of the present invention for imparting particular characteristics thereto, as long as attainment of the objects of the present invention is not hindered.

The flame retardant thermotropic polyester composition of the present invnetion can be molded into three-dimensional shaped articles, rod, tube, sheet, etc. by means of injection molding, extrusion molding, blower molding, etc., and their use is not specifically limited. The injection shaped articles are the most preferable use.

When the filler (C) is not incorporated. an injection molded article preferably has a heat distortion temperature (HDT, °C.) satisfying the following formula (2), determined according to ASTM D-648, most preferably the following formula (2');

$$-20 < [HDT] - 323 + 6.8x < 20 \qquad (2)$$

$$-10 < [HDT] - 323 + 6.8x < 10 \qquad (2')$$

wherein x represents the ratio (mol %) of the structural unit (IV) to the sum of the structural units (I), (II), (III) and (IV).

When the injection molded article contains the filler (C), the heat distortion temperature (HDT, °C.) determined according to ASTM D-648 preferably satisfies the following formula (3), more preferably the following formula (3');

$$-20 < [HDT] - z + 6.8x - 85 < 20 \qquad (3)$$

$$-10 < [HDT] - z + 6.8x - 85 < 10 \qquad (3')$$

wherein x represents the ratio (mol % the structural unit (IV) to the sum of the structural units (I), (II), (III) and (IV); and z represents the value defined in the following formula (4);

$$z = -1/90 \cdot y^2 + 29/30 \cdot y + 238 \quad (4)$$

wherein y represents the ratio (% by weight) of the filler (C) in the composition to the sum of the filler (C) and the liquid crystal polyester (A).

The injection-molded article of the present invention is excellent in terms of flame retardancy, heat resistance and mechanical properties, and is also provided with excellent appearance as shaped article.

EXAMPLE

Referential Example 1

This referential example relates to a process for the preparation of (a) as the thermotropic polyester (A).

A reaction vessel equipped with a distillation tube and a stirrer was charged with 994.5 g (7.2 moles) of p-hydroxybenzoic acid (I), 125.7 g (0.675 mole) of 4,4'-dihydroxybiphenyl (II), 112.1 g (0.675 mole) of terephthalic acid, 216.2 g (1.125 moles) of polyethylene terephthalate (IV) having an intrinsic viscosity of about 0.6, and 960.2 g (9.4 moles) of acetic anhydride, and deacetylation polymerization was then effected under the following conditions.

The reaction was firstly effected at 130° to 150° C. for 4 hours in nitrogen atmosphere. The temperature was increased up to 250° C. over 2.5 hours, and the reaction was further continued at 250° C. for 2.5 hours. Furthermore, the temperature inside the system was increased up to 320° C. over 2 hours, followed by pressure reduction of the inside of the system down to 0.3 mmHg over 1.5 hours, and then the reaction was continued for 30 minutes to complete polycondensation. As a result of the reaction described above, a polymer of beige color was obtained.

The theoretical structural formula of this polymer is as shown below, and the results of the elementary analysis of the obtained polymer fully agree with the theoretical values:

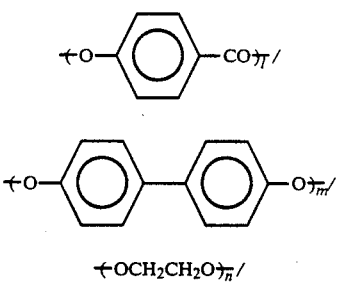

l/m/n/o = 80/7.5/12.5/20.

The polyester was placed on a sample stage of a polarization microscope, and the temperature was elevated to confirm the optical anisotropy. Consequently, it was found that the initiation temperature of liquid crystallization was 294° C., and that the polymer exhibited good optical anisotropy.

The melting point of this polymer was measured at a temperature-elevating rate of 20° C./min, using a Model DSC-7 manufactured by Perkin-Elmer, and it was found that the peak temperature $Tm_1$ was 316° C. while the peak temperature $Tm_2$ was 312° C.

The logarithmic viscosity of the polymer was 1.70 dl/g while the melt viscosity of the polymer was 1,000 poise, as measured at a temperature of 322° C. and a shear rate of 1,000 sec$^{-1}$. Thus, the flowability of the polymer was very good.

Referential Example 2

This referential example relates to a process for the preparation of (b) as the thermotropic polyester (A).

A reaction vessl as in Referential Exmaple 1 was charged with 1019.4 g (7.38 moles) of p-hydroxybenzoic acid (I), 134.1 g (0.72 mole) of 4,4'-dihydroxybiphenyl (II), 119.6 g (0.72 mole) of terephthalic acid, 173.0 g (0.9 mole) of polyethylene terephthalate (IV) having an intrinsic viscosity of about 0.6 and 960.2 g (9.4 moles) of acetic anhydride, and deacetylation polymerization was then effected under the following conditions.

The reaction was firstly promoted at 130° to 150° C. for 4 hours in a nitrogen atmosphere. The temperature was increased up to 250° C. over 2.5 hours, and the reaction was further continued at 250° C. for 2.5 hours. Furthermore, the temperarture in the system was increased up to 325° C. over 2 hours, followed by pressure reduction of the inside of the system down to 0.3 mmHg over 1.5 hours, and then the reaction was continued for 30 minutes to complete polycondensation. As a result of the reaction described above, a polymer of beige color was obtained.

The theoretical structural formula of this polymer is as shown below, and the results of the elementary analysis of the obtained polymer fully agree with the theoretical values:

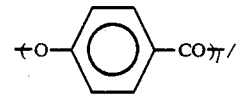
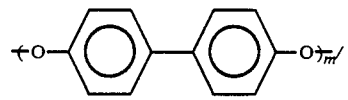
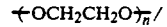
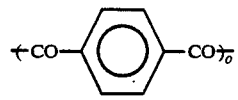

l/m/n/o = 82/8/10/18.

The polyester was placed on a sample stage of a polarization microscope, and the temperature was then elevated to confirm optical anisotropy. Consequently, it was found that the initiation temperature of liquid crystallization was 305° C, and that the polymer demonstrated good optical anisotropy.

The melting point of this polymer was measured under the same condition as in Example 1, and it was found that the peak temperature $Tm_1$ was 330° C. while the peak temperature $Tm_2$ was 326° C.

The logarithmic viscosity of the polymer was 1.85 dl/g and the melt viscosity of the polymer was 880 poise, as measured at a temperature of 336° C. and a shear rate of 1,000 sec$^{-1}$. Thus, the flowability of the polymer was extremely great.

Referential Examples 3 to 12

By the same method as in Referential Example 1, (c) to (1) as the thermotropic polyester (A) components were prepared, by charging p-hydroxybenzoic acid (I), 4,4'-dihydroxybiphenyl (II), hydroquinone (III-1), t-butylhydroquinone (III-2), phenylhydroquinone (III-3), 2,6-diacetoxynaphthalene (III-4), polyethylene terephthalate (IV-1), polyethylene terephthalate oligomer (logarithmic viscosity 0.18) (IV-2), bis($\beta$-hydroxyethyl) terephthalate (IV-3), terephthalic acid (V-1), isophthalic acid (V-2), 2,6-naphthalene dicarboxylic acid (V-3), 4,4'-diphenyl ether dicarboxylic acid (V-4), and 4,4'-diphenyldicarboxylic acid (V-5), at ratios shown in FIG. 1.

vated to confirm the optical anisotropy. It was found that the initiation temperature of liquid crystallization was 288° C., and that the polymer demonstrated good optical anisotropy. The melting point of this polymer was measured under the same condition as in Example 1, and it was found that the peak temperature $Tm_1$ was 324° C. while the peak temperature $Tm_2$ was 292° C.

The logarithmic viscosity of the polymer was 0.63 dl/g whereas the melt viscosity of the polymer was 1200 poise, as measured at a temperature of 302° C. and a shear rate of 1,000 sec$^{-1}$.

Example 1

Six parts by weight of poly(bromostyrene)(bromine content, 59%) having a number average molecular weight of $10 \times 10^4$ and a weight average molecular weight of $30 \times 10^4$ produced by the polymerization of

TABLE 1

| Referential Example | A | (I) | (II) | (III)-1 | (III)-2 | (III)-3 | (III)-4 | (IV-1) | (IV-2) | (IV-3) | (V-1) | (V-2) | (V-3) | (V-4) | (V-5) | Tm (Tm$_2$) (°C.) | logorithmic viscosity (dl/g) |
|---|---|---|---|---|---|---|---|---|---|---|---|---|---|---|---|---|---|
| 3 | (c) | | 7.5 | | | | | 12.5 | | | 7.5 | | | | | 312 | 1.64 |
| 4 | (d) | | 7.5 | | | | | 7.5 | 2.5 | | 10 | | | | | 315 | 1.72 |
| 5 | (e) | | 6 | 1.5 | | | | | | | 7.5 | | | | | 313 | 1.81 |
| 6 | (f) | | 6 | | 1.5 | | | | | | 7.5 | | | | | 308 | 1.63 |
| 7 | (g) | 80 | 6 | | | 1.5 | | | | | 7.5 | | | | | 310 | 1.77 |
| 8 | (h) | | 6 | | | | 1.5 | 12.5 | | | 7.5 | | | | | 310 | 1.90 |
| 9 | (i) | | 7.5 | | | | | | | | 6 | 1.5 | | | | 303 | 1.61 |
| 10 | (j) | | 7.5 | | | | | | | | 6 | | 1.5 | | | 309 | 2.07 |
| 11 | (k) | | 7.5 | | | | | | | | 6 | | | 1.5 | | 309 | 2.00 |
| 12 | (l) | | 7.5 | | | | | | | | 6 | | | | 1.5 | 311 | 1.95 |

Referential Example 13

This referential example relates to a method of producing (m) as the thermotropic polyester (A).

A reaction vessel as in Referential Example 1 was charged with 1296 g (7.2 moles) of p-hydroxybenzoic acid (I) and 345.6 g (1.8 moles) of polyethylene terephthalate (IV) having an intrinsic viscosity of about 0.6 dl/g, and deacetylation polymerization was then effected under the following conditions.

Firstly, the reaction was carried out at 250° to 300° C. for 3 hours in a nitrogen atmosphere. The pressure was then reduced down to 1 mmHg, and the heating was further continued for 5 hours to complete polycondensation. As a result of the reaction described above, a polymer of beige color was obtained.

The theoretical structural formula of this polymer was as shown below;

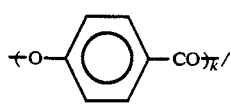

$+OCH_2CH_2O+_l/$

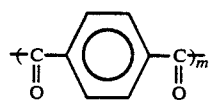

k/l/m = 80/20/20.

The polyester was placed on a sample stage of a polarization microscope, and the temperature was elemonomer mixture containing 80% by weight of dibromostyrene, 15% by weight of monobromostyrene, and 5% by weight of tribromostyrene, and 45 parts by weight of a glass fiber of an average diameter of 6 $\mu$m were blended with 100 parts by weight of the thermotropic polyester (a) of the Referential Example 1 by means of a ribbon blender, followed by melt-kneading and pelleting at 310° C. by using an extruder equipped with a twin-screw bent of 40 mm$\phi$. The obtained pellet was supplied into an injection molding machine (Sumitomo-Nestal Promat 40/25 manufactured by Sumitomo Heavy Machine Industry, K.K.), and injection molded at a cylinder temperature of 320° C. and a mold temperature of 90° C., into combustion test pieces (1/32"×½"×5") and test pieces (⅛"×½"×5") for bending test and the measurement of heat distortion temperature under load (HDT). Regarding these test pieces, the appearance was observed, and the vertical-type combustion test was carried out according to UL-94 Standard while HDT (18.56 kgf/cm$^2$) was measured according to ASTM D648.

As a result, the flame retardancy, bending strength and HDT of the polyester blended with the organic bromine compound of the present invention were 1/32"V-0 and non-drip (ND), 1,862 kgf/cm$^2$ and 257° C., respectively, which indicate that the polyester are excellent in the mechanical and thermal properties and has superior appearance as shaped articles.

Retention stability of the polyester was then examined after retention in a molding machine for 30 minutes and molding, and no reduction in the physical properties was observed such that the bending strength was nearly the same as described above, i.e., 1,845 kgf/cm$^2$ (retention rate 99%). The color of the shaped articles hardly changed (light yellow).

Comparative Example 1

When 5.2 parts by weight of brominated(polystyrene)(bromine content, 68%) having a number average molecular weight of $10\times10^4$ produced by the bromination of polystyrene was used instead of the poly(bromostyrene) in Example 1, the flame retardancy, bending strength and HDT were 1/32" V-0 and non-drip (ND), 1,825 kgf/cm² and 254° C., respectively.

Retention stability was then examined after retention in a molding machine for 30 minutes as in Example 1, and the bending strength was reduced down to 1,550 kgf/cm² (retention rate 85%). The color of the shaped articles changed from yellow to brown.

Comparative Example 2

When 6.0 parts of brominated(polystyrene)(bromine content, 60%) having a number average molecular weight of $10\times10^4$ produced by the bromination of polystyrene was used instead of the poly(bromostyrene) in Example 1, the flame retardancy, bending strength and HDT were 1/32" V-0 and non-drip (ND), 1,790 kgf/cm² and 254° C., respectively.

Retention stability was then examined after retention in a molding machine for 30 minutes as in Example 1, and the bending strength was reduced down to 1,500 kfg/cm² (retention rate 81%). the color of the shaped articles changed from yellow to brown.

Examples 2 through 7

Ten parts of poly(dibromostyrene)(B)(bromine content, 59%) in Example 1, 0 to 0.2 part by weight of phosphite compound (C-1) and phenolic compound (C-2), and 45 parts by weight of a glass fiber of an average diameter of 6 to 13 μm were blended with 100 parts by weight of the thermotropic polyester (a) in Referential Example 1 by means of a ribbon blender, followed by melt kneading and pelleting, as in Example 1. As in Example 1, the pellet obtained was injection molded into combustion test pieces (1/32" and 0.5 mm ×½"×5"), which were then subjected to the vertical-type combustion test according tu UL-94. The flame retardancy of the shaped article of a glass fiber diameter of 6 μm was the greatest, and the flame retardancy of the article of a thickness of 0.5 mm was V-0 and non-drip (ND). With C-1 added, the flame retardancy of the shaped article of a glass fiber diameter of 10 μm was V-0 (ND) even when its thickness was 0.5 mm, and flame retardancy of the article improved to V-1 (ND) with C-2 added.

TABLE 1

| Example | Glass fiber diameter (μm) | Phosphite Comp. & phenolic Comp. (C) Types | Wt Parts | UL-94 Flame retardancy (thickness) 1/32" | 0.5 mm |
|---|---|---|---|---|---|
| 2 | 6 | — | 0 | V-0 (ND) | V-0 (ND) |
| 3 | 10 | — | 0 | V-0 (ND) | V-1 |
| 4 | 13 | — | 0 | V-0 (ND) | V-2 |
| 5 | 10 | C-1 | 0.3 | V-0 (ND) | V-0 (ND) |
| 6 | 10 | C-2 | 0.3 | V-0 (ND) | V-1 (ND) |
| 7 | 10 | C-1 C-2 | 0.15 0.15 | V-0 (ND) | V-1 (ND) |

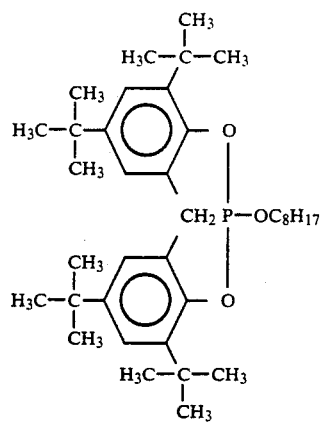

(C-1)

(Molecular weight, 583)

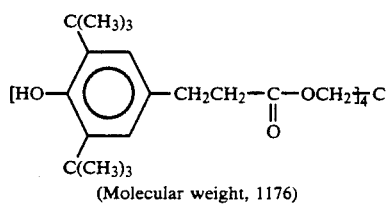

(C-2)

(Molecular weight, 1176)

Example 8

8.7 parts by weight of poly(dibromostyrene) (bromine content, 60%) having a number average molecular weight of $10\times10^4$ and a weidht average molecular weight of $25\times10^4$ produced by the polymerization of the dibromostyrene monomer, and 45 parts by weight of a glass fiber of an average diameter of 6 μm were blended with 100 parts by weight of the thermotropic polyester (b) of the Referential Example 2 of by means of a ribbon blender, followed by melt-kneading and pelleting at 320° C. by using an extruder equipped with a bent of 40 mmφ. The obtained pellet was supplied to an injection molding machine (Sumitomo-Nestal Promat 40/25 manufactured by Sumitomo Heavy Machine Industry, K.K.) and injection molded, at a cylinder temperature of 330° C. and a mold temperature of 90° C., into combustion test pieces (1/32"×½"×5") and test pieces (¼"×½"×5") for bending test and the measurement of heat distortion temperature (HDT). Regarding these test pieces, the appearance was observed, and the vertical-type combustion test was carried out according to UL-94 Standard while HDT (18.56 kgf/cm²) was measured according to ASTM D648.

As a result, the flame retardancy, bending strength and HDT of the polyester blended with the organic bromine compound of the present invention were 1/32" V-0 and non-drip (ND), 1,840 kgf/cm² and 273° C., respectively, which indicate that the polyester is excellent in the mechanical and thermal properties and has superior appearance as shaped articles.

Retention stability of the polyester was then examined, after retention in a molding machine for 30 minutes and molding, and only a little reduction in the physical properties was observed such that the bending strength was 1,695 kgf/cm² (retention rate 92%). The color of the shaped articles hardly changed (light yellow).

Comparative Example 3

When 7.7 parts by weight of brominated(polystyrene)(bromine content, 68%) in comparative Example 1 was used instead of the poly(dibromostyrene) in Example 8, the flame retardancy, bending strength and HDT were 1/32" V-0 and non-drip (ND), 1,650 kgf/cm² and 270° C., respectively.

As in Example 6, retention stability was then examined after retention in a molding machine for 30 minutes, and the bending strength was reduced down to 1,220 kgf/cm² (retention rate 74%). The color of the shaped articles changed from yellow to dark brown.

Examples 9 through 21

5.1 to 13.8 parts of poly(bromostyrene)(B)(bromine content, 59%) in Example 1, 0 to 1.0 part by weight of phosphite compounds (C-1, C-3 and C-4), 0 to 0.1 part by weight of phenolic compound (C-2), and 45 parts by weight of glass fiber of an average diameter of 6 μm were blended with 100 parts by weight of the thermotropic polyester (b) in Referential Example 2, by means of a ribbon blender, followed by melt kneading and pelleting, as in Example 6. As in Example 6, the pellet obtained was injection molded into combustion test pieces (1/32" and 0.5 mm×½"×5"), which were then subjected to the vertical-type combustion test according to UL-94. The flame retardancy was apparently improved by the addition of C-1 to C-3.

C-1 and C-2 are the compounds of the same formulas as in Example 5 and 6.

TABLE 2

| Example | poly(bromo styrene) (wt parts) | Phosphite Comp. & phenolic Comp. (C) Types | Phosphite Comp. & phenolic Comp. (C) Wt Parts | UL-94 Flame retartdancy thickness 1/32" | UL-94 Flame retartdancy thickness 0.5 mm |
|---|---|---|---|---|---|
| 9 | 5.1 | — | 0 | V-2 | V-2 |
| 10 | 5.1 | C-1 | 0.3 | V-0 (ND) | V-2 |
| 11 | 5.1 | C-2 | 0.3 | V-1 (ND) | V-2 |
| 12 | 5.1 | C-3 | 0.3 | V-1 (ND) | V-2 |
| 13 | 5.1 | C-4 | 0.3 | V-1 (ND) | V-2 |
| 14 | 5.1 | C-1 | 1.0 | V-0 (ND) | V-1 (ND) |
| 15 | 6.8 | — | 0 | V-0 (ND) | V-1 (ND) |
| 16 | 6.8 | C-1 | 0.3 | V-0 ND) | V-1 (ND) |
| 17 | 8.7 | — | 0 | V-0 (ND) | V-1 (ND) |
| 18 | 10.2 | — | 0 | V-0 (ND) | V-1 (ND) |
| 19 | 10.2 | C-1 | 0.3 | V-0 (ND) | V-0 (ND) |
| 20 | 12.0 | — | 0 | V-0 (ND) | V-1 (ND) |
| 21 | 13.8 | — | 0 | V-0 (ND) | V-0 (ND) |

Comparative Example 4

When 4.4 to 12.0 parts by weight of brominated (polystyrene)(bromine content, 68%) in Comparative Example 1 was used instead of the poly(bromostyrene) in Example 9 to 21, no effect was observed from adding phosphite compounds (C-1, C-3 and C-4) and phenolic compound (C-2), and the flame retardancy of the all polyesters of a thickness of 0.5 mm was V-2.

Examples 22-25

When the retention test was carried out in a molding machine as in Example 1 by using the poly(bromostyrene) of a number average molecular weight and a weight average molecular weight shown in Table 3, instead of the poly(bromostyrene) in Example 1, the reduction rate of the bending strength was lower in any case than in Comparative Example 1.

TABLE 3

| Example | Poly(bromostyrene) number average MW (×10⁴) | Poly(bromostyrene) weight average MW (×10⁴) | Bending strength in 30 min retention rate (%) |
|---|---|---|---|
| 22 | 1 | 3.3 | 92 |
| 23 | 3 | 10 | 97 |
| 24 | 4 | 15 | 99 |
| Example 25 | 25 | 75 | 99 |

Example 26

By using a machine of testing soldering properties (manufactured by Tabai Seisaku), the bending test pieces obtained in Example 1, and Comparative Examples 22–25, were immersed for 10 seconds to observe their appearance and measure the solder resistant temperature which does not cause deformation.

The solder resistance of the test pieces of Example 1 and Examples 22–25 was 300° C. after 30-minute retention, which did not change at all compared with the temperature prior to the retention, while the temperature of Comparative Example 1 changed dramatically from 290° C. to 250° C.

Examples 27 to 36

Molding was effected by using thermotropic polyester (c) to (1) instead of the thermotropic polyester (a) in Example 1, and the bending strength was high, while HDT thereof was 1/32" V-0 and non-drip (ND).

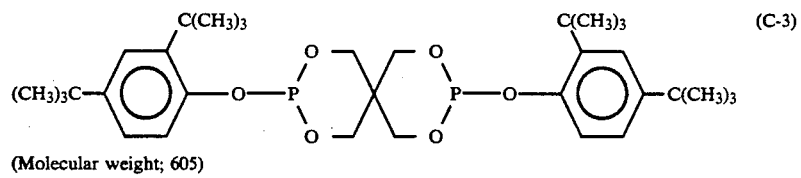

(C-3)

(Molecular weight; 605)

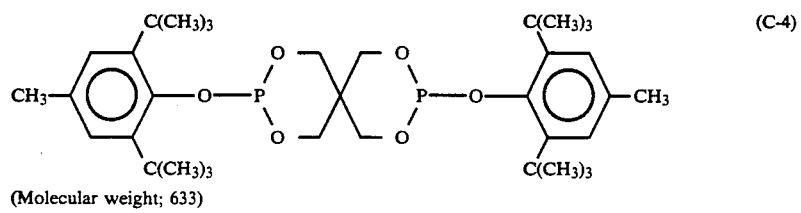

(C-4)

(Molecular weight; 633)

The retention stability in the molding machine was much more remarkable, i.e., retention rate of 95% or more, than in Comparative Example 1.

TABLE 4

| Example | thermotropic polyester (A) Types | Bending strength (kgf/cm²) | HDT (°C.) | Retention stability (retention rate %) |
|---|---|---|---|---|
| 27 | c | 1845 | 256 | 99 |
| 28 | d | 1835 | 252 | 99 |
| 29 | e | 1790 | 250 | 98 |
| 30 | f | 1800 | 250 | 96 |
| 31 | g | 1820 | 249 | 98 |
| 32 | h | 1840 | 256 | 96 |
| 33 | i | 1770 | 245 | 95 |
| 34 | j | 1830 | 249 | 98 |
| 35 | k | 1840 | 253 | 98 |
| 36 | l | 1790 | 250 | 99 |

Example 37

Twelve partes by weight of poly(bromostyrene) (bromine content, 59%) in Example 1, and 45 parts by weight of a glass fiber of an average diameter of 6 μm were blended with 100 parts by weight of the thermotropic polyester (m) of the Referential Example 13 by means of a ribbon blender, followed by melt-kneading and pelleting, at 310° C. by using an extruder having a bent of 40 mmφ. The obtained pellet was supplied to an injection molding machine (Sumitomo-Nestal Promat 40/25, manufactured by Sumitomo Heavy Machine Industry, K.K.) and injection molded, at a cylinder temperature of 320° C. and a mold temperature of 90° C., into combustion test pieces (1/32"×½"×5") and test pieces (¼"×½"×5") for bending test and the measurement of heat distortion temperature under load. Regarding these test pieces, the appearance was observed, and the vertical-type combustion test was carried out according to UL-94 Standard while HDT (18.56 kgf/cm²) was measured according to ASTM D648.

As a result, the flame retardancy, bending strength and HDT of the polyester blended with the organic bromine compounds of the present invention were 1/32" V-0 and non-drip (ND), 1530 kgf/cm² and 200° C., respectively.

Retention stability of the polyester was then examined after retention in a molding machine for 30 minutes and molding, and a little reduction in the physical properties was observed such that the bending strength was nearly the same as described above, i.e., 1,270 kgh/cm² (retention rate 83%).

Comparative Example 4

When the brominated(polystyrene) (bromine content, 60%) in Comparative Example 2 was used instead of the poly(bromostyrene) in Example 37, the flame retardancy was V-0 and non-drip (ND) at 1/32", whereas the bending strength and HDT were 1480 kgf/cm² and 200° C., respectively.

Retention stability was then examined after retention in a molding machine for 30 minutes as in Example 37, and the bending strength was decreased down to 1,060 kgf/cm² (retention rate 72%). The color changed from yellow to brown.

We claim:

1. A flame-retardant thermotropic polyester composition comprising 100 parts by weight of thermotropic polyester (A) and 0.5 to 60 parts by weight of poly(-bromostyrene) (B) having the following structural unit produced from bromostyrene monomer as the principal structural componen thereof and having a number average molecular weight of $1 \times 10^4$ to $15 \times 10^4$;

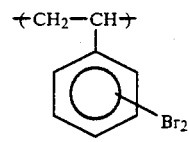

2. The flame-retardant thermotropic polyester composition claimed in claim 1, wherein the thermotropic polyester (A) is a polyester containing ethylenedioxy unit as the essential component thereof.

3. The flame-retardant thermotropic polyester composition claimed in claim 2, wherein the thermotropic polyester (A) is a polyester composed of the structural unit selected from the following structural units (I) to (V), and the amount of the structural units [(I)+(II)+(III)] is 77 to 95 mol% of the amount of the structural units [(I)+(II)+(III)+(IV)]; the amount of the structural unit (IV) is 23 to 5 mole% of the structural units [(I)+(II)+(III)+(IV)] the molar ratio of the structural unit (I)/the units [(II)+(III)] is 75/25 to 95/5; and the molar ratio of the structural unit (II)/the unit (III) is 100/0 to 67/33;

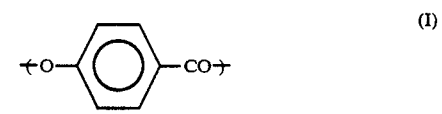

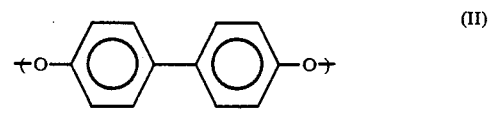

[wherein x in the formuls represents one or more groups selected from

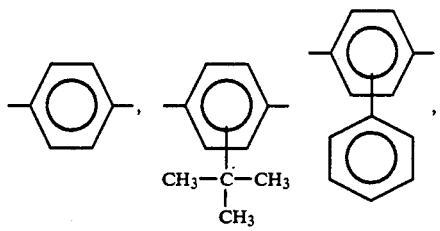

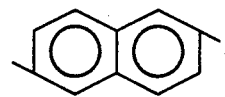

; Y represents one ore more groups selected from

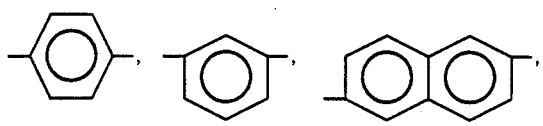

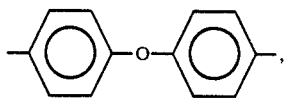

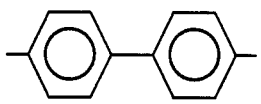

; and the structural unit (V) is substantially equimolar to the structural units [(II)+(III)+(IV)].

4. The flame-retardant thermotropic polyester composition claimed in claim 1, wherein 100 prats by weight of he thermotropic polyester (A) is allowed to contain 3 to 20 parts by weight of poly(bromostyrene) (B).

5. The flame-retardant thermotropic polyester composition claimed in claim 1, wherein the poly(bromostyrene) has a number average molecular weight of $1 \times 10^4$ to $15 \times 10^4$ and has a weight average molecular weight of $2 \times 10^4$ to $60 \times 10^4$.

6. The flame-retardant thermotropic polyester composition claimed in claim 1, wherein 60 wt. % or more of the poly(bromostyrene) (B) is composed of the dibromo styrene unit and the sum of the monobromostyrene unit and/or tribromostyrene unit is 40 wt. % or less.

7. The flame-retardant thermotropic polyester composition claimed in claim 1, wherein 100 parts by weight of the thermotropic polyester (A) is further allowed to contain 0.001 to 5 parts by weight of phenolic compound and/or phosphite compound (C), having a molecular weight of 500 or more and containing one or more aromatic rings.

8. The flame-retardant thermotropic polyester composition claimed in claim 8, wherein the phenolic compound is one or more compound selected from n-octadecyl-3(4'-hydroxy-3',5'-di-t-butylphenol)propionate, tetrakis[methylene-3(3',5'-di-t-butyl-4'-hydroxyphenyl) propionate]methane, triethylene glycol bis-3(3'-t-butyl- 4'-hydroxy-5-methylphenyl)propionate.

9. The flame-retardant thermotropic polyester composition claimed in claim 7, wherein the phosphite compound is one or more compounds selected from 2,2'-methylene-bis(4,6-di-t-butylphenyl)n-octylphosphite, tris(2,4-di-t-butylphenyl)phosphite, bis(2,4-di-t-butylphenyl) pentaerythritol diphosphite, and bis(2,6-di-t-butyl-4-methylphenyl)pentaerythritol diphosphite.

10. The flame-retardant thermotropic polyester composition claimed in claim 7, wherein the phosphite compound is 2,2'-methylene-bis(4,6-di-t-butylpheyl)-n-octylphosphite of the following formula;

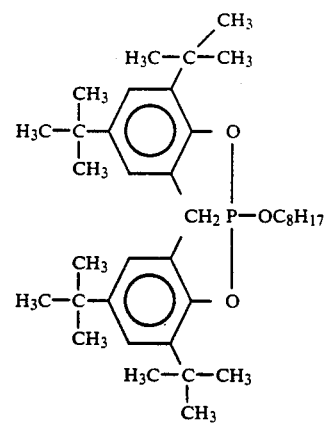

11. The flame-retardant thermotropic polyester composition claimed in claim 3, wherein the amount of the structural units [(I)+(II)+(III)] of the thermotropic polyester (A) is 82 to 93 mol % of the amount of the structural units [(I)+(II)+(III)+(IV)]; the amount of the structural unit (IV) is 18 to 7 mol % of the structural units [(I)+(II)+(III)+(IV)]; the molar ratio of the structural unit (I)/ the units [(II)+(III)] is 78/22 to 93/7; and the molar ratio of the structural unit (II)/ the unit (III) is 100/0 to 90/10.

12. The flame-retardant thermotropic polyester composition claimed in claim 1 or 7, wherein 100 parts by weight of the thermotropic polyester (A) is allowed to contain 1 to 200 parts by weight of filler (D).

13. The flame-retardant thermotropic polyester composition claimed in claim 12, wherein the filler (D) is a glass fiber.

14. The flame-retardant thermotropic polyester composition claimed in claim 13, wherein the average fiber diameter of the glass fiber is 3 to 11 μm.

15. The flame-retardant thermotropic polyester composition claimed in claim 13, wherein the average fiber diameter of the glass fiber is 3 to 8 μm.

16. A shaped article produced by injection or extrusion molding of a flame-retardant thermotropic polyester composition comprising 100 parts by weight of thermotropic polyester (A) and 0.5 to 60 parts by weight of poly(bromostyrene)(B) having the following structural unit produced from bromostyrene monomer as the principal structural component thereof and having a number average molecular weight of $1 \times 10^4$ to $15 \times 10^4$;

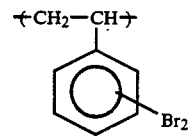

17. The shaped article claimed in claim 16, wherein the thermotropic polyester (A) is a polyester containing ethylenedioxy unit as the essential component thereof.

18. The shaped article claimed in claim 17, wherein the thermotropic polyester (A) is a polyester composed of the structural unit selected from the following structural units (I) to (V), and the amount of the structural units [(I)+(II)+(III)] is 77 to 95 mol % of the amount of the structural units [(I)+(II)+(III)+(IV)]; the amount of the structural unit (IV) is 23 to 5 mol % of the structural units [(I)+(II)+(III)+(IV)]; the molar ratio of the structural unit (I)/ the units [(II)+(III)] is 75/25 to 95/5; and the molar ratio of the structural unit (II)/the unit (III) is 100/0 to 67/33;

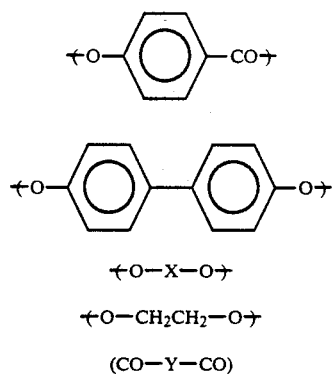

(I)

(II)

+O—X—O+ (III)

+O—CH₂CH₂—O+ (IV)

(CO—Y—CO) (V)

[wherein X in formulas represents one or more groups selected from

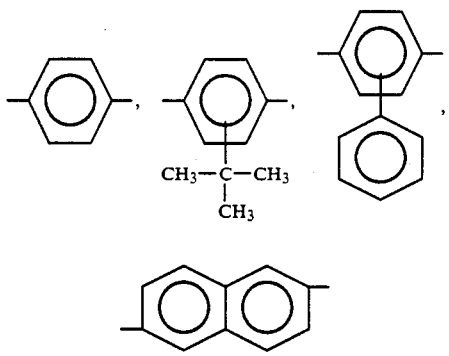

; Y represents one or more groups selected from

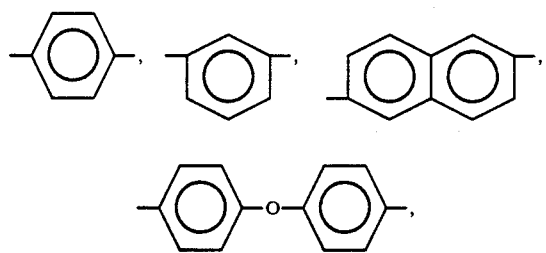

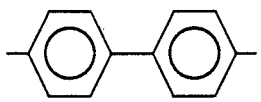

; and the structural unit (V) is substantially equimolar to the structural units [(II)+(III)+(IV)].

19. The shaped article claimed in claim 16, wherein 100 parts by weight of the thermotropic polyester (A) is further allowed to contain 0.001 to 5 parts by weight of phenolic compound and/or phosphite compound (C), having a molecular weight of 500 or more and containing one or more aromatic rings.

20. The shaped article claimed in claim 18, wherein 100 parts by weight of the thermotropic polyester (A) is further allowed to contain 0.001 to 5 parts by weight of phenolic compound and/or phosphite compound (C), having a molecular weight of 500 or more and containing one or more aromatic rings.

21. The shaped article claimed in claim 16 or 19, wherein 100 parts by weight of the thermotropic polyester (A) is further allowed to contain 1 to 200 parts by weight filler (D).

22. The shaped article claimed in claim 18, wherein 100 parts by weight of the thermotropic polytester (A) is further allowed to contain 1 to 200 parts by weight of the filler (D).

23. The injection molded article claimed in claim 18 or 20 wherein the heat distortion temperature [HDT](°C.) satisfies the following formula(1);

$$-20 < [HDT] - 323 + 6.8x < 20 \quad (1)$$

wherein x represents the ratio of the structural unit (IV) to the structural units [(I)+(II)+(III)+(IV)].

24. The injection-molded article produced by injection molding of the flame-retardant polyester composition claimed in claim 22, the HDT (°C.) of the composition satisfying the following formula (2);

$$-20 < [HDT] - Z + 6.8x - 85 < 20 \quad (2)$$

wherein x represents the ratio (mol %) of the structural unit (IV) to the structural units [(I)+(II)+(III)+(IV)]; and Z represents the value defined in the following formula (3);

$$z = -1/90 \cdot y^2 + 29/30 \cdot y + 238 \quad (3)$$

wherein y represents the ratio (wt. %) of the filler in the composition to the sum of the filler and the thermotropic polyester (A).

* * * * *

UNITED STATES PATENT AND TRADEMARK OFFICE
CERTIFICATE OF CORRECTION

PATENT NO. : 5,221,705
DATED : June 22, 1993
INVENTOR(S) : Toshihide Inoue, Yasunori Ichikawa, Masaru Okamoto and Norio Kitajima It is certified that error appears in the above-indentified patent and that said Letters Patent is hereby corrected as shown below:

Column 2, at line 55, please change

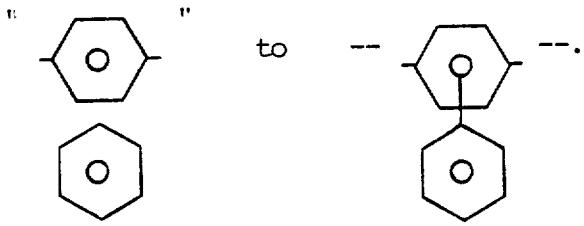

Column 9, line 25, after "in" insert --a--.

Column 10, line 1, please change "Tm₂" to --Tm₁--.

Column 13, line 46, please change "tu" to --to--.

Column 18, line 1, please change "componen" to --component--; and line 44, please change "formuls" to --formulas--.

UNITED STATES PATENT AND TRADEMARK OFFICE
CERTIFICATE OF CORRECTION

PATENT NO.  : 5,221,705
DATED       : June 22, 1993
INVENTOR(S) : Toshihide Inoue et al It is certified that error appears in the above-indentified patent and that said Letters Patent is hereby corrected as shown below:

On the title page, at [30], line 4, please change "3-58328" to --3-85328--.

Signed and Sealed this

Twentieth Day of September, 1994

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,221,705
DATED : June 22, 1993
INVENTOR(S) : Toshihide Inoue et al It is certified that error appears in the above-indentified patent and that said Letters Patent is hereby corrected as shown below:

At column 21, at about line 20, please change "(CO—Y—CO)" to -- $\text{\textlparen}\!\!\text{CO}-\text{Y}-\text{CO}\!\!\text{\textrparen}$ --.

Signed and Sealed this

Twenty-ninth Day of November, 1994

Attest:

BRUCE LEHMAN

Attesting Officer    Commissioner of Patents and Trademarks